United States Patent
Kim et al.

(10) Patent No.: US 10,958,451 B2
(45) Date of Patent: Mar. 23, 2021

(54) AUTHENTICATION APPARATUS AND METHOD

(71) Applicants: ICTK Holdings Co., LTD., Seongnam-si (KR); IUCF-HYU (INDUSTRY-UNIVERSITY COOPERATION FOUNDATION HANYANG UNIVERSITY), Seoul (KR)

(72) Inventors: Dong Kyue Kim, Seoul (KR); Byong Deok Choi, Seoul (KR); Kwang Hyun Jee, Gyeonggi-do (KR)

(73) Assignees: ICTK Holdings Co., LTD., Seongnam-si (KR); IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 0 days.

(21) Appl. No.: 15/302,932

(22) PCT Filed: Apr. 9, 2015

(86) PCT No.: PCT/KR2015/003577
§ 371 (c)(1),
(2) Date: Dec. 27, 2016

(87) PCT Pub. No.: WO2015/156622
PCT Pub. Date: Oct. 15, 2015

(65) Prior Publication Data
US 2017/0134176 A1    May 11, 2017

(30) Foreign Application Priority Data

Apr. 9, 2014   (KR) .................. 10-2014-0042362
Apr. 9, 2015   (KR) .................. 10-2015-0050163

(51) Int. Cl.
*H04L 9/32*       (2006.01)
*H04W 12/02*    (2009.01)
(Continued)

(52) U.S. Cl.
CPC ........ *H04L 9/3278* (2013.01); *G06F 12/1408* (2013.01); *G06F 21/44* (2013.01);
(Continued)

(58) Field of Classification Search
CPC ... H04L 9/3278; G06F 12/1408; H04W 12/06
(Continued)

(56) References Cited

U.S. PATENT DOCUMENTS 6,957,342 B2    10/2005   Vatanen
9,722,786 B2 *   8/2017   Kim .................. H04L 9/0866
(Continued)

FOREIGN PATENT DOCUMENTS

CN    102934130 A    2/2013
CN    103930895 A    7/2014
(Continued)

OTHER PUBLICATIONS

Menezes, A. et al., "Chapter 12: Key Establishment Protocols," Chapter from "Handbook of Applied Cryptography," Available Online at http://cacr.uwaterloo.ca/hac/about/chap12.pdf, CRC Press, Oct. 2001, 54 pages.
(Continued)

*Primary Examiner* — Teshome Hailu
(74) *Attorney, Agent, or Firm* — McCoy Russell LLP

(57) ABSTRACT

An interface element connected to a device and a security die-chip are fabricated in a single package. The security die-chip may provide a security authentication function to the interface element that does not have the security authentication function. The security die-chip may include a physically unclonable function (PUF) to provide a private key,
(Continued)

and a hardware security module to perform encryption and decryption using the private key.

13 Claims, 10 Drawing Sheets

(51) Int. Cl.
| | |
|---|---|
| *H04W 12/06* | (2021.01) |
| *H04L 12/58* | (2006.01) |
| *G09C 1/00* | (2006.01) |
| *H04L 9/08* | (2006.01) |
| *G06F 12/14* | (2006.01) |
| *G06F 21/44* | (2013.01) |
| *H04W 88/02* | (2009.01) |
| *H04W 12/00* | (2021.01) |

(52) U.S. Cl.
CPC .............. *G09C 1/00* (2013.01); *H04L 9/0866* (2013.01); *H04L 51/00* (2013.01); *H04W 12/02* (2013.01); *H04W 12/06* (2013.01); *G06F 2212/1052* (2013.01); *H04W 12/00405* (2019.01); *H04W 88/02* (2013.01)

(58) Field of Classification Search
USPC .......................................................... 713/185
See application file for complete search history.

(56) References Cited

U.S. PATENT DOCUMENTS

| | | | | |
|---|---|---|---|---|
| 9,787,670 | B2* | 10/2017 | Kim ....................... H04L 9/321 |
| 2002/0077886 | A1* | 6/2002 | Chung ............... G06K 7/10336 |
| | | | | 705/12 |
| 2010/0199103 | A1 | 8/2010 | Van Rijnswou | |
| 2010/0250936 | A1* | 9/2010 | Kusakawa ........... H04L 9/3278 |
| | | | | 713/169 |
| 2012/0033810 | A1* | 2/2012 | Devadas ................. G06F 21/31 |
| | | | | 380/46 |
| 2012/0108209 | A1* | 5/2012 | Sun ....................... H04H 60/15 |
| | | | | 455/411 |
| 2013/0142329 | A1 | 6/2013 | Bell et al. | |
| 2013/0156183 | A1* | 6/2013 | Komano ............... H04L 9/0866 |
| | | | | 380/44 |
| 2014/0258736 | A1* | 9/2014 | Merchan ................. G06F 21/62 |
| | | | | 713/193 |
| 2014/0270177 | A1* | 9/2014 | Brickell ................ H04L 9/0877 |
| | | | | 380/278 |

FOREIGN PATENT DOCUMENTS

| | | | |
|---|---|---|---|
| EP | 2544400 | A2 | 1/2013 |
| JP | 2002534808 | A | 8/2002 |
| JP | 2004054128 | A | 2/2004 |
| KR | 1020110127521 | A | 11/2011 |
| KR | 101139630 | B1 | 5/2012 |
| KR | 20130040118 | A | 4/2013 |
| KR | 1020130040119 | A | 4/2013 |
| KR | 1020130129334 | A | 11/2013 |
| KR | 1020140026316 | A | 3/2014 |
| TW | 201342868 | A | 10/2013 |
| WO | 2006115213 | A1 | 11/2006 |
| WO | 2014030911 | A1 | 2/2014 |

OTHER PUBLICATIONS

European Patent Office, Extended European Search Report Issued in Application No. 15777341.7, dated Apr. 16, 2018, Germany, 11 pages.
State Intellectual Property Office of the People's Republic of China, Office Action Issued in Application No. 201580025731.4, dated Nov. 5, 2018, 19 pages.
Japanese Patent Office, Office Action Issued in Application No. 2017-505026, dated Oct. 1, 2019, 3 pages. (Submitted with Machine Translation).
Jacobi, J., "The Best Encrypted Flash Drives," PC World Website, Available Online at https://www.pcworld.com/article/254816/the_best_encrypted_flash_drives.html, May 23, 2012, 6 pages.
European Patent Office, Office Action Issued in Application No. 15777341.7, dated May 18, 2020, Germany, 6 pages.
Japanese Patent Office, Office Action Issued in Application No. 2017-505026, dated Dec. 8, 2020, 9 pages (Submitted with Machine Translation).

* cited by examiner

AUTHENTICATION APPARATUS AND METHOD

CROSS-REFERENCE TO RELATED APPLICATIONS

The present application is a U.S. National Phase of International Patent Application Serial No. PCT/KR2015/003577, entitled "AUTHENTICATION APPARATUS AND METHOD," filed on Apr. 9, 2015. International Patent Application Serial No. PCT/KR2015/003577 claims priority to Korean Patent Application No. 10-2014-0042362, filed on Apr. 9, 2014; and to Korean Patent Application No. 10-2015-0050163, filed on Apr. 9, 2015. The entire contents of each of which are hereby incorporated by reference in their entirety for all purposes.

TECHNICAL FIELD

Embodiments relate to an authentication apparatus and method, and more particularly, to a device, and an apparatus and method for performing authentication of data stored in the device and/or data transmitted and received by the device.

BACKGROUND ART

An Internet of Things (IoT) environment is expected to grow. In the IoT environment, various physical objects, for example various sensors, home appliances or vehicles, as well as existing communication devices, for example smartphones or tablets, are connected to a network. In the above IoT environment, security and authentication are recognized as the most important technology.

The security and authentication are understood to include authentication of devices or things, security of data stored in devices, and/or protection of information transmitted and received by devices. However, because the security is a factor that hinders a performance and convenience, a large number of devices that are already in wide use do not have a security function or are vulnerable to the security.

A physically unclonable function (PUF) may provide an unpredictable digital value. Individual PUFs may provide different digital values, even though the individual PUFs are manufactured through the same exact manufacturing process. The PUF may be referred to as a "physical one-way function (POWF)" that is practically impossible to be duplicated.

The above unclonability of the PUF may be used to generate an identifier of a device for security and/or authentication. For example, the PUF may be used to provide a unique key to distinguish devices from one another.

Korean Patent Registration No. 10-1139630 (hereinafter, referred to as "'630 patent") proposes a method of implementing a PUF. The '630 patent discloses a method of probabilistically determining whether an inter-layer contact or a via is generated between conductive layers of a semiconductor, based on a semiconductor process variation.

DETAILED DESCRIPTION OF THE INVENTION

Technical Solutions

Embodiments provide an apparatus and method for enabling hardware-based authentication in a device that does not have an authentication function. By the apparatus and method, authentication of the device, protection of data stored in the device, and/or security of a communication of data transmitted and received by the device may be implemented at a high level.

According to an aspect, there is provided an authentication apparatus including an interface element to interface with a device, and a security die-chip to form a package with the interface element, and to provide a hardware-based authentication to the interface element in the package. The security die-chip may include a physically unclonable function (PUF) to provide a private key, and a hardware-wired security module to perform encryption and decryption using the private key.

The authentication apparatus may further include a control chip to control the security die-chip to interface with the device. The control chip may include, but is not limited to, for example, a smart card die-chip.

In an example, the interface element may be a secure digital (SD). In this example, the security die-chip may encrypt data stored in the SD. In another example, the interface element may be a subscriber identity module (SIM). In this example, the security die-chip may perform authentication of the device using a server connected via a network to the device.

According to another aspect, there is provided a storage device including a flash memory, a controller to read data from the flash memory and to control a data program of the flash memory, and a hardware-based security die-chip to encrypt first data recorded by the controller on the flash memory, and to generate second data that is encrypted. The controller may store the second data in the flash memory. The security die-chip may include a PUF to provide an authentication key, and a hardware-wired security module to encrypt the first data using the authentication key. The authentication key may include, but is not limited to, for example, a key value used for a symmetric key encryption algorithm.

The storage device may further include a smart card die-chip to control the security die-chip to interface with at least one of the controller and an external device located outside the storage device.

When an authenticated access request for the first data is received, the security die-chip may decrypt the second data to the first data using the authentication key.

The storage device may be either an SD card or a micro SD card. The storage device may include the security die-chip in a package based on a standard of the SD card or the micro SD card.

According to another aspect, there is provided, an operating method of the storage device, the operating method including encrypting, by a hardware-wired security module of a security die-chip packaged in the storage device, first data using a private key provided by a PUF in the security die-chip, and generating second data, when the first data to be stored in the storage device is received, and programming, by a controller of the storage device, the second data in a flash memory of the storage device.

According to another aspect, there is provided, a device authentication method using an interface element connected to a device, the device authentication method including generating, by a hardware-wired security module included in a security die-chip packaged together with the interface element, a digital signature using a private key provided by a PUF in the security die-chip, and transmitting the digital signature to an external device through the device and the interface element so that the external device verifies the digital signature, the external device being connected to the device. The interface element may include, but is not limited to, for example, at least one of an SD, a SIM, a radio frequency identification (RFID), a Bluetooth interface, a near field communication (NFC) interface and a universal serial bus (USB).

According to another aspect, there is provided, a security communication method using an interface element connected to a device, the security communication method including receiving an encrypted session key from an external device through the interface element, the session key being encrypted using a public key, decrypting, by a hardware-wired security module included in a security die-chip packaged together with the interface element, the encrypted session key using a private key provided by a PUF in the security die-chip, and acquiring a session key, encrypting, by the hardware-wired security module, a message using the session key and generating an encrypted message, and transmitting the encrypted message through the interface element. The interface element may include, but is not limited to, for example, at least one of an SD, a SIM, a Bluetooth interface, a USB and an NFC interface.

BEST MODE FOR CARRYING OUT THE INVENTION

Figure 1:
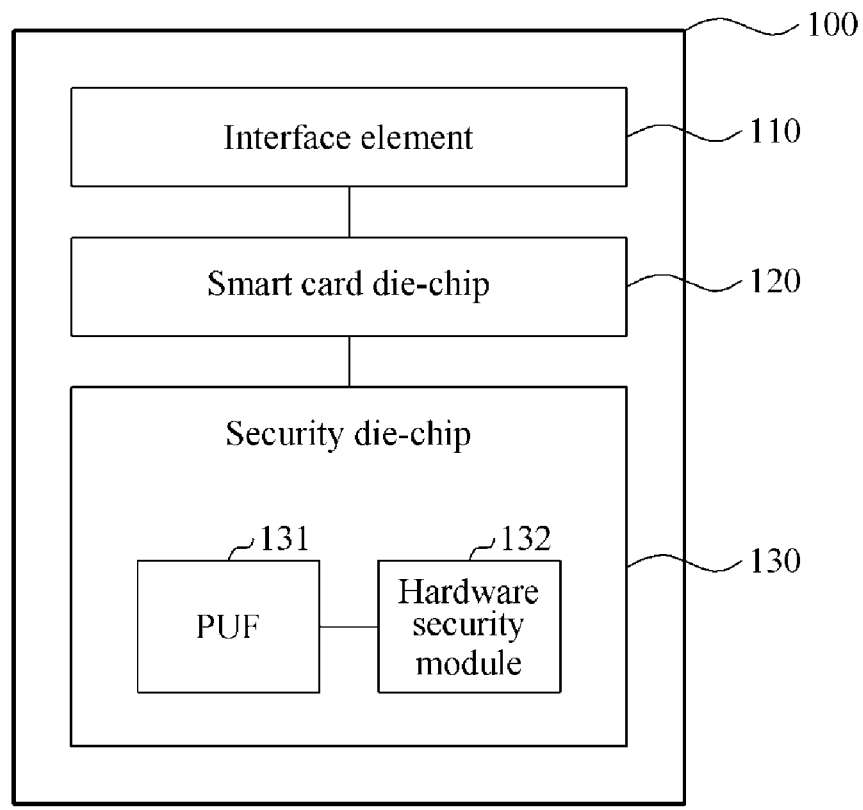
FIG. 1 is a block diagram illustrating an authentication apparatus according to an embodiment.

Hereinafter, embodiments will be described in detail with reference to the accompanying drawings. The scope of the right, however, should not be construed as limited to the embodiments set forth herein. Regarding the reference numerals assigned to the elements in the drawings, it should be noted that the same elements will be designated by the same reference numerals.

Also, terms used herein are selected from general terms being used in the related arts. Yet, the meanings of the terms used herein may be changed depending on a change and/or development of technologies, a custom, or preference of an operator in the art. Accordingly, the terms are merely examples to describe the embodiments, and should not be construed as limited to the technical idea of the present disclosure.

In addition, in a specific case, most appropriate terms are arbitrarily selected by the applicant for ease of description and/or for ease of understanding. In this instance, the meanings of the arbitrarily used terms will be clearly explained in the corresponding description. Hence, the terms should be understood not by the simple names of the terms but by the meanings of the terms and the following overall description of this specification.

FIG. 1 is a block diagram illustrating an authentication apparatus 100 according to an embodiment. The authentication apparatus 100 may include an interface element 110 that interfaces with a device. The device may be an arbitrary apparatus connected to an external device via wires and/or a wireless network, and may include, for example, a smartphone, a tablet, a typical computing terminal, an Internet of Things (IoT) terminal, or a vehicle.

The interface element 110 may correspond to, but is not limited to, one of a secure digital (SD), a micro SD, a subscriber identity module (SIM), a universal SIM (USIM), a nano-SIM, a near field communication (NFC) interface, a universal serial bus (USB), and a Bluetooth interface. A standard of the interface element 110 may be set. For example, various standards, for example, a physical size (for example, a dimension) or functions of terminals may be set as a standard or industrial standard, and a protocol or a frequency band to communicate with an external device may also be set. The authentication apparatus 100 may be packaged with the interface element 110 as a single substrate in an external housing of the interface element 110 in a range in which the above set standard is not changed, that is, a range allowing all general operations of the interface element 110. Accordingly, an external appearance of the authentication apparatus 100 may be similar to a typical SD card, a SIM chip, an NFC module or a USB stick, and the authentication apparatus 100 may perform a function of a general SD card or SIM chip without a change.

As described above, the interface element 110 and/or the above devices may not have a security and/or authentication (security/authentication) function, or may be vulnerable to a security attack even though the interface element 110 and/or the devices have the security/authentication function. A security die-chip 130 may provide hardware-based security authentication to the interface element 110 or a device that does not include a reliable security/authentication device. "Security/authentication" may be understood to include authentication of a device, protection of data stored in the device, and/or security of a communication of data transmitted and received by the device. In the present disclosure, the term "hardware-based" may be understood to indicate that a key value used in security authentication is held by a physically unclonable function (PUF) and that an encryption and decryption algorithm is performed by a circuit that is a true hardware logic, instead of by a software application. Because the encryption and decryption algorithm is physically performed by a hardware logic, the hardware logic may be called as a dedicated hardware HW or a hardware-wired logic.

The security die-chip 130 may include a PUF 131, and a hardware-wired (hardware-based) security module 132. In the present disclosure, a hardware-wired security module may be referred to as a "hardware security module." The PUF 131 may provide a private key unique to the authentication apparatus 100. The hardware security module 132 may perform encryption and decryption using the private key.

The PUF 131 may be implemented in various embodiments. For example, the PUF 131 may be implemented based on a process variation in a semiconductor manufacturing process. The PUF 131 may be implemented by inter-layer contacts or vias between conductive layers, which has been further described with reference to the '630 patent that is cited in the present disclosure.

The PUF 131 may be implemented in a portion of a semiconductor, to implement the security die-chip 130, that is, the hardware security module 132. Accordingly, it is impossible to identify an exact position of the PUF 131 when the PUF 131 is observed outside. Because a semiconductor circuit includes an extremely large number of vias or inter-layer contacts, it is difficult to recognize which portion of the semiconductor circuit is used as the PUF 131, which may be advantageous in terms of a security.

Furthermore, a single PUF 131 or a plurality of PUFs 131 may be provided. One of the PUFs 131 may be actually used. It is more difficult to recognize which PUF provides a private key that is to be actually used for encryption and decryption, even though an operation and wiring of the hardware security module 132 are fully understood. Thus, it is possible to implement hardware-based security with a higher level.

The authentication apparatus 100 may further include a control chip (not shown) to control the security die-chip 130 to interface with an external device and/or the interface element 110. The control chip may include, but is not limited to, for example, a smart card die-chip 120 of FIG. 1. The smart card die-chip 120 may be a hardware chip, however, may have a vulnerability to security authentication due to a concern about leakage of software that may be stored in a smart card, a risk of contamination of an internal program by a malignant code during updating of smart card firmware, and a concern about a physical attack, for example, bus probing. A smart card may include an information provider (IP), for example a central processing unit (CPU), a read only memory (ROM) or a random access memory (RAM), because the above IPs are vulnerable to a memory scan attack, bus probing or a physical attack to analyze a layout by reverse engineering after depackaging. Accordingly, the smart card die-chip 120 may control an interface between the security die-chip 130 and an external device, or an interface between the security die-chip 130 and the interface element 110. Various security applications and an operation of each component of the authentication apparatus 100 will be further described below.

Figure 2:
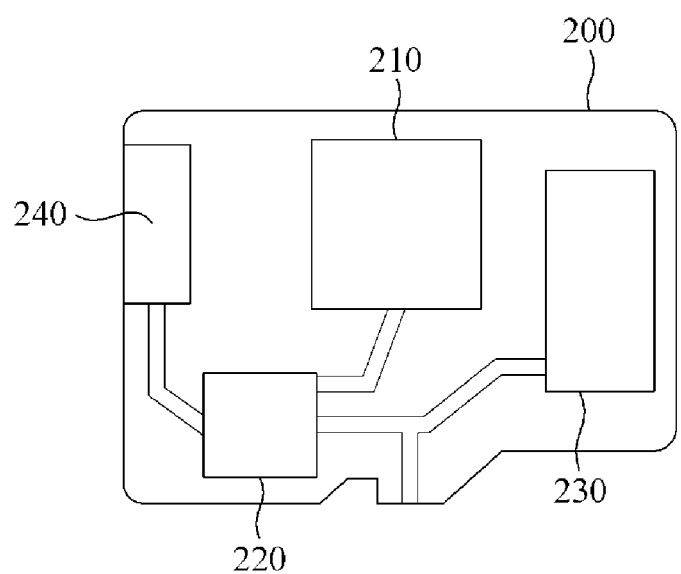
FIG. 2 illustrates a secure digital (SD) card according to an embodiment.

FIG. 2 illustrates an SD card 200 according to an embodiment. The SD card 200, known as a storage, may include an SD card controller 230 and a flash memory 240. A standard, an external appearance, a terminal function, the SD card controller 230 and the flash memory 240 of the SD card 200 may comply with a typical SD card standard. A security die-chip 210 and a smart card die-chip 220 may be packaged together in the SD card 200 and accordingly, it is possible to perform hardware-based security authentication. The security die-chip 210 may include a PUF to provide a private key, and a hardware security module to perform encryption and decryption using the private key.

The security die-chip 210 and the smart card die-chip 220 may be packaged together in the SD card 200 and thus, it is possible to encrypt important data that needs to be stored in the flash memory 240 and to safely store the encrypted data, to protect the stored data. Also, it is possible to perform device authentication, for example, an identification and/or authentication of the SD card 200 or a device into which the SD card 200 is inserted, and/or to perform a security communication for security of a communication to safely transmit data stored in the SD card 200 or data stored in a device into which the SD card 200 is inserted to a reliable institution. A process of protecting stored data, and a device authentication process will be further described with reference to FIGS. 5, and 6, respectively. Also, a security communication process will be further described with reference to FIGS. 7 and 8.

Figure 3:
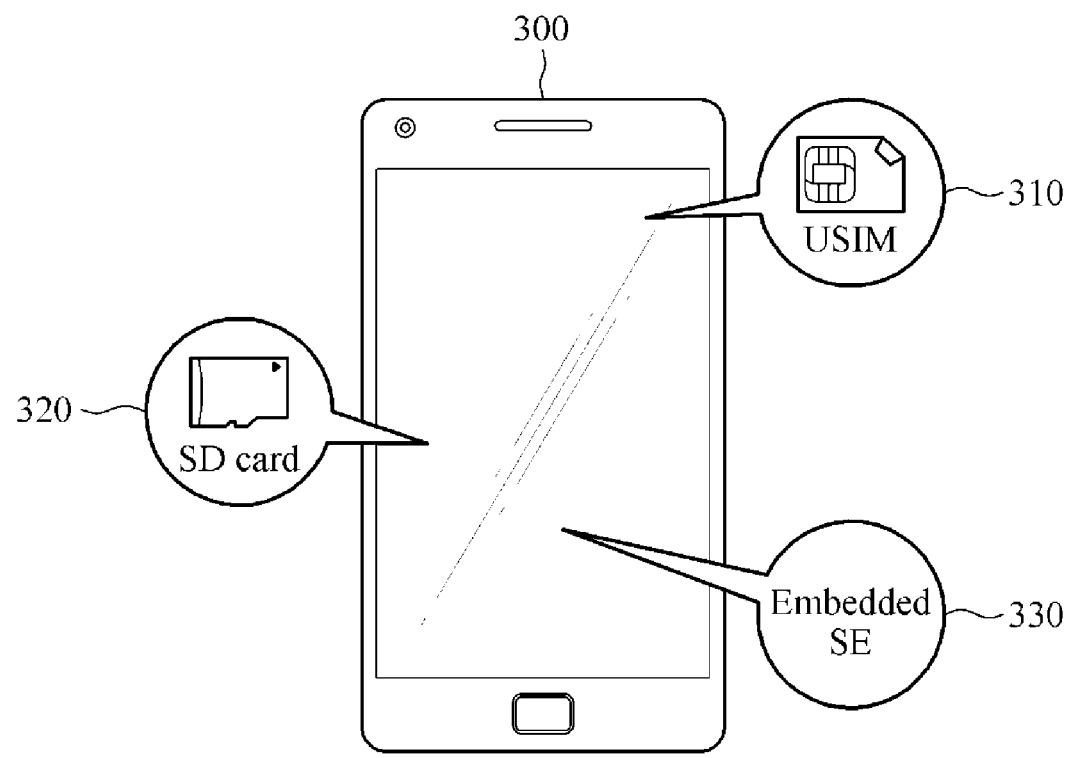
FIG. 3 illustrates authentication apparatuses interfacing with a device according to an embodiment.

FIG. 3 illustrates authentication apparatuses interfacing with a device 300 according to an embodiment. An authentication apparatus may be implemented as, for example, a USIM card 310 inserted into the device 300, or an SD card 320. The SD card 320 may have the same configuration as the SD card 200 of FIG. 2. The authentication apparatus may be detachably mounted in a device via a card slot, for example, an interface included in the device. The authentication apparatus may provide hardware-based security authentication to a device that does not have a hardware-based security authentication function, and may be applicable to a general-purpose computer or a vehicle including a USB connector as well as a smartphone or a tablet that is already in wide use. Thus, the authentication apparatus may have a high commercial value.

For example, during manufacturing of the device 300, the authentication apparatus may be attempted to be embedded. In this example, the authentication apparatus may be implemented as an embedded security element (SE) 330.

Figure 4:
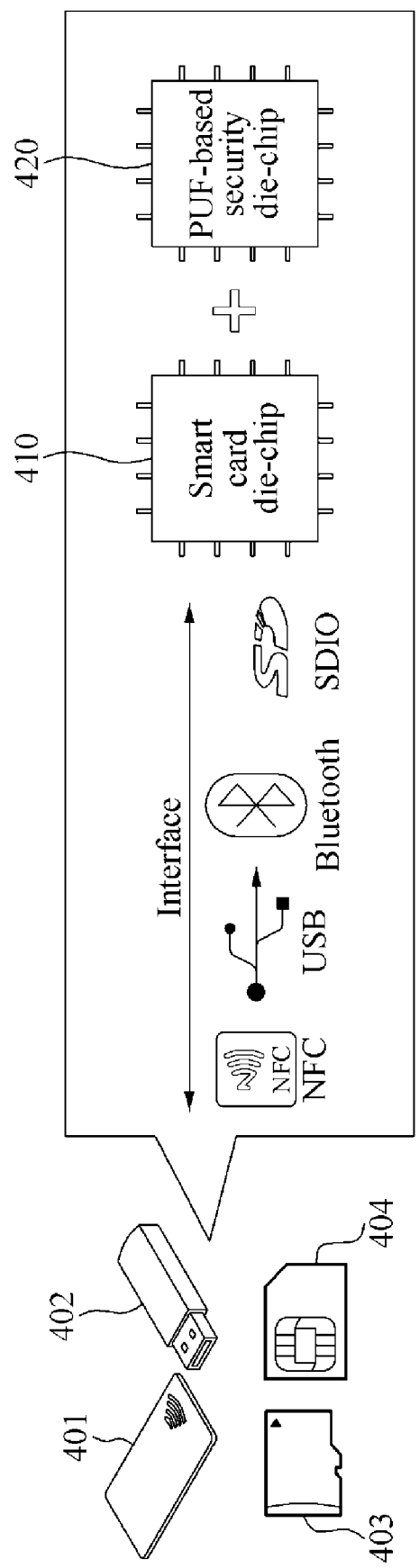
FIG. 4 is a diagram provided to explain an interface between an authentication apparatus and a device according to an embodiment.

FIG. 4 is a diagram provided to explain an interface between an authentication apparatus and a device according to an embodiment. A hardware-based authentication apparatus may be implemented in various forms, for example, a credit card 401 including a smart card, a USB stick 402, an SD card 403 or a SIM chip 404. As described above, implementation of security authentication may not exclude or interfere with a function of each of a typical contact-type or contactless-type credit card, a USB, an SD card and a SIM chip. By packaging, hardware security authentication may be further provided to the credit card, the USB, the SD card and the SIM chip and thus, it is possible to achieve data protection, device authentication, and a security communication.

A smart card die-chip 410 may support a PUF-based security die-chip 420. For example, an interface to an external device may be provided. The interface may include, for example, a contact interface capable of being mounted in a compact chip, a contact-type communication interface (for example, an NFC interface), or a local area communication interface (for example, a Bluetooth interface). The contact interface may include, for example, a USB or a secure digital input output (SDIO). The smart card die-chip 410 may also support a connection program or various application programs enabling the PUF-based security die-chip 420 to provide a security function.

The PUF-based security die-chip 420 may perform an authentication function, for example, encryption or decryption, and may provide a security (data security) function of a reliable storage space, a device authentication function, and a communication security function. As described above, in the PUF-based security die-chip 420, a PUF to provide a private key and a hardware security module may be packaged as a single chip.

The PUF may be understood as an unclonable hardware fingerprint. It may be almost impossible to find out a value of the PUF by a physical attack. In addition, as described above, because PUF cells and general cells are mixed and physically randomly arranged in a security die-chip, it may be very difficult to find all PUF cells. Furthermore, because a PUF value is read during an operation, it may be very difficult to perform a physical attack, for example, depackaging while maintaining a valid operation. Moreover, even though binary values provided by the PUF are read out, it may be much more difficult to efficiently use the binary values and arrange the binary values in a valid order due to an extremely large number of combinations of the binary values.

Using the PUF as a root key or a seed key used to encrypt another value, a high-level security authentication may be enabled, and the PUF may be safe despite a physical attack (safe key management). In addition, when a private key corresponding to a public key used to perform device authentication is implemented as a PUF, a value of the private key may not be exposed outside a device and thus, safe device authentication and prevention of denials may be guaranteed regardless of a communication scheme, a type or form of a mobile device including a chip.

The hardware security module may be manufactured completely with hardware, and may be designed and manufactured by applying a scheme of responding to a sub-channel attack. Because the hardware security module is implemented by hardware, a software attack, that is, an attack by a malignant code may not be valid. Even though it is possible to modify a hardware circuit using equipment, for example, focused ion beam (FIB) equipment, it may be difficult to obtain a valid attack result while guaranteeing an original operation. Thus, integrity of a security chip may be guaranteed.

Figure 5:
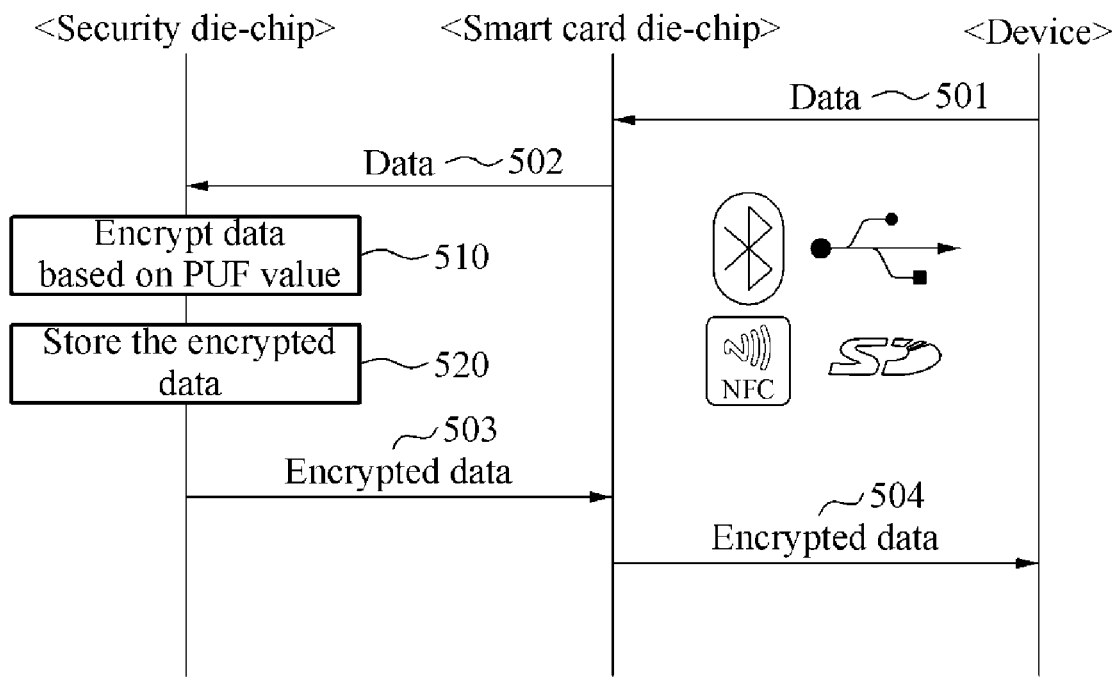
FIG. 5 is a flowchart illustrating an operating method of a storage device according to an embodiment.

FIG. 5 is a flowchart illustrating an operating method of a storage device according to an embodiment. FIG. 5 illustrates an example of data security. When a smart card die-chip receives data 501 from a device or an external device, data 502 may be transferred to a security die-chip. In operation 510, the security die-chip may encrypt the data 502 based on a PUF value. In operation 520, the security die-chip may store the encrypted data in a medium, for example, a flash memory. Because the data stored in operation 520 is already encrypted, the data may be stored in a freely accessible flash memory or kept outside the device, instead of being stored in isolated space, for example, a nonvolatile memory of a PUF-based chip. The above storage device may be used to encrypt data and transfer the encrypted data.

When a request to access encrypted data 503 is received from an apparatus or external server that is authenticated, encrypted data 504 may be transferred. When the external server or apparatus has a public key corresponding to a PUF-based private key used to encrypt the data in operation 510, the encrypted data 504 may be decrypted.

Figure 6:
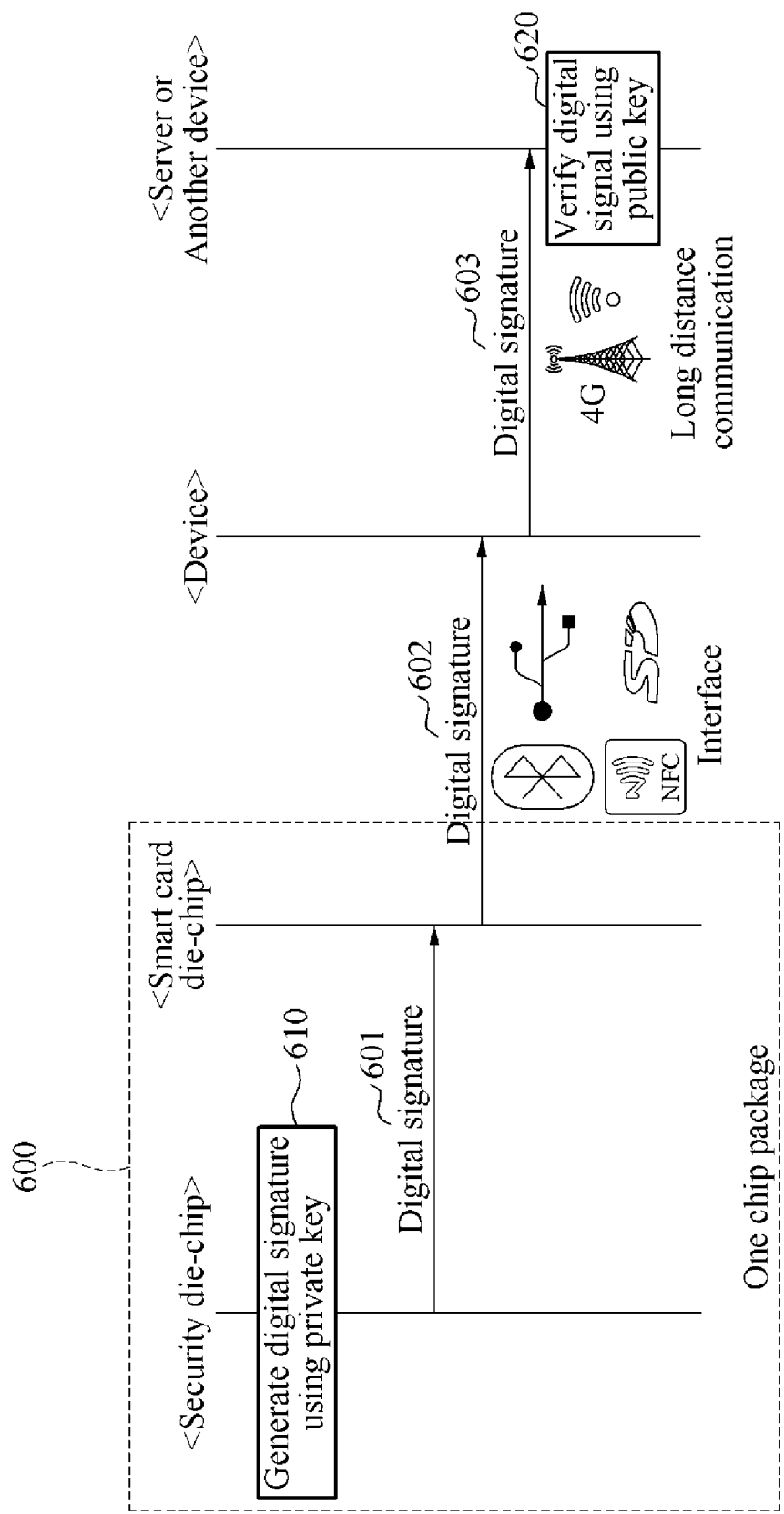
FIG. 6 is a flowchart illustrating a device authentication method according to an embodiment.

FIG. 6 is a flowchart illustrating a device authentication method according to an embodiment. An authentication apparatus 600 may include a security die-chip and a smart card die-chip. The smart card die-chip may support the security die-chip to perform authentication of a device. In operation 610, a hardware security module included in the security die-chip may generate a digital signature 601 using a private key provided by a PUF included in the security die-chip.

The digital signature 601 may be transmitted to the device through the smart card die-chip using various schemes, that is, an external interface, for example, a Bluetooth interface, a USB, an NFC interface or an SD card interface. The above interfaces may correspond to a relatively short distance communication or a contact communication and accordingly, a communication function of the device, for example, a smartphone may be used to connect to the Internet or a network, to provide a service. When a digital signature 602 is received, the device may transmit a digital signature 603 to a server or another device using a broadband network, for example, a wireless fidelity (WiFi) or a fourth generation mobile communication (4G). In operation 620, the digital signature 603 may be verified using a public key corresponding to the private key. Through the above process, the authentication of the device may be performed.

Application services based on device authentication may be extremely diverse. For example, the device authentication may be used to verify a user terminal that is registered in an electronic payment. Also, the device authentication may be used for a simple payment or an automatic payment to boost electronic commerce as well as basic terminal authentication. When funds are transferred in a smart backing, the device authentication may be performed using a digital signature instead of using an authentication certificate. The above application may be useful, because an existing software-based authentication certificate may be replaced and/or complemented by a true hardware-based authentication certificate. The authentication certificate may have meaning of complementation of knowledge-based authentication represented by an identification (ID) and a password by a possession-based authentication. However, because the authentication certificate is stored in the form of a digital file, a problem of illegal outflow of the authentication certificate may occur. For example, when a true hardware-based digital signature is enabled, device authentication with an extremely high reliability may be possible. Moreover, financial companies may expect an effect of preventing a user from denying a transaction completed with a digital signature, based on uniqueness and unclonability of the PUF.

Figure 7:
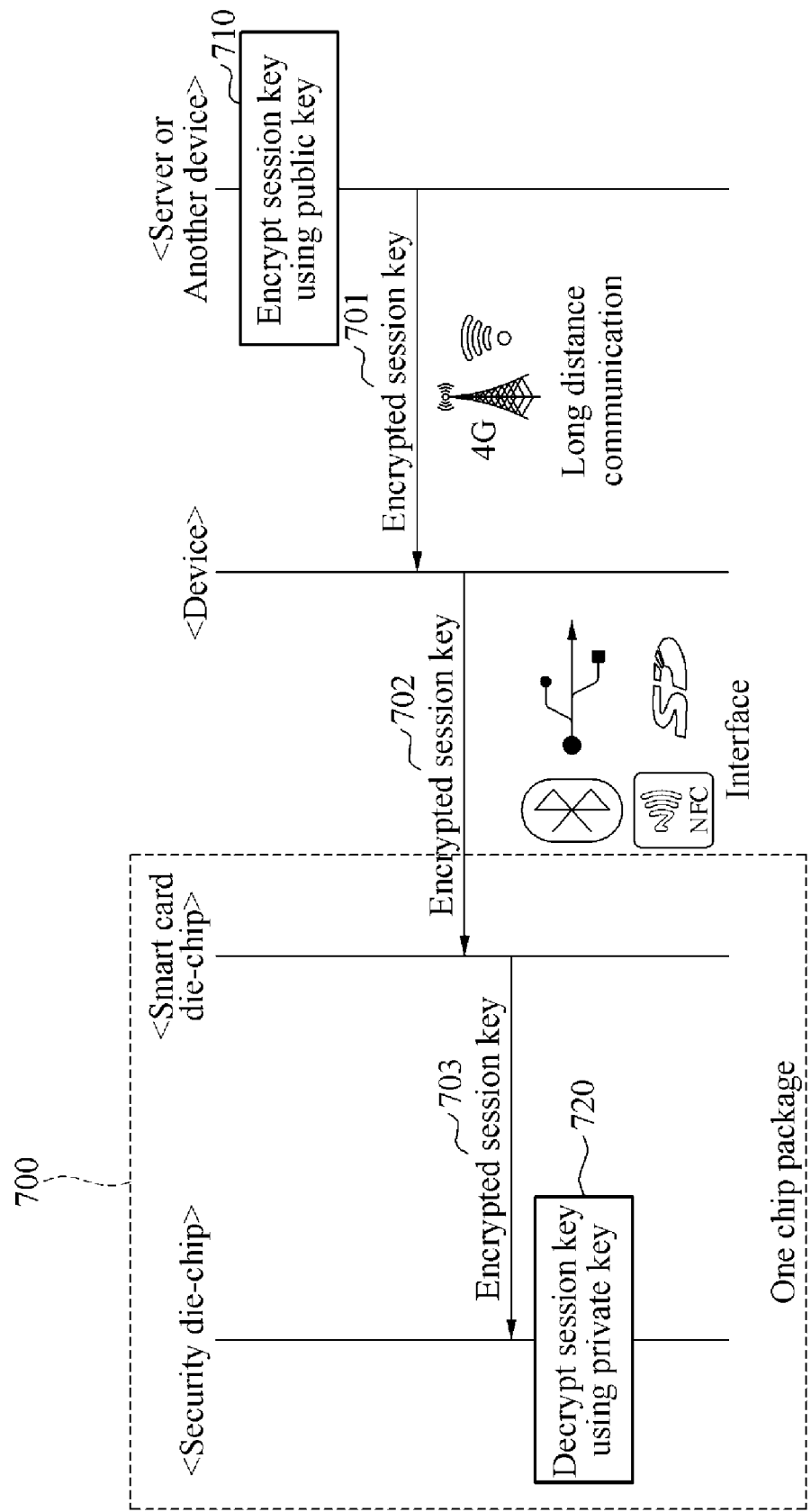
FIGS. 7 and 8 are flowcharts illustrating a security communication method according to an embodiment.
Figure 8:
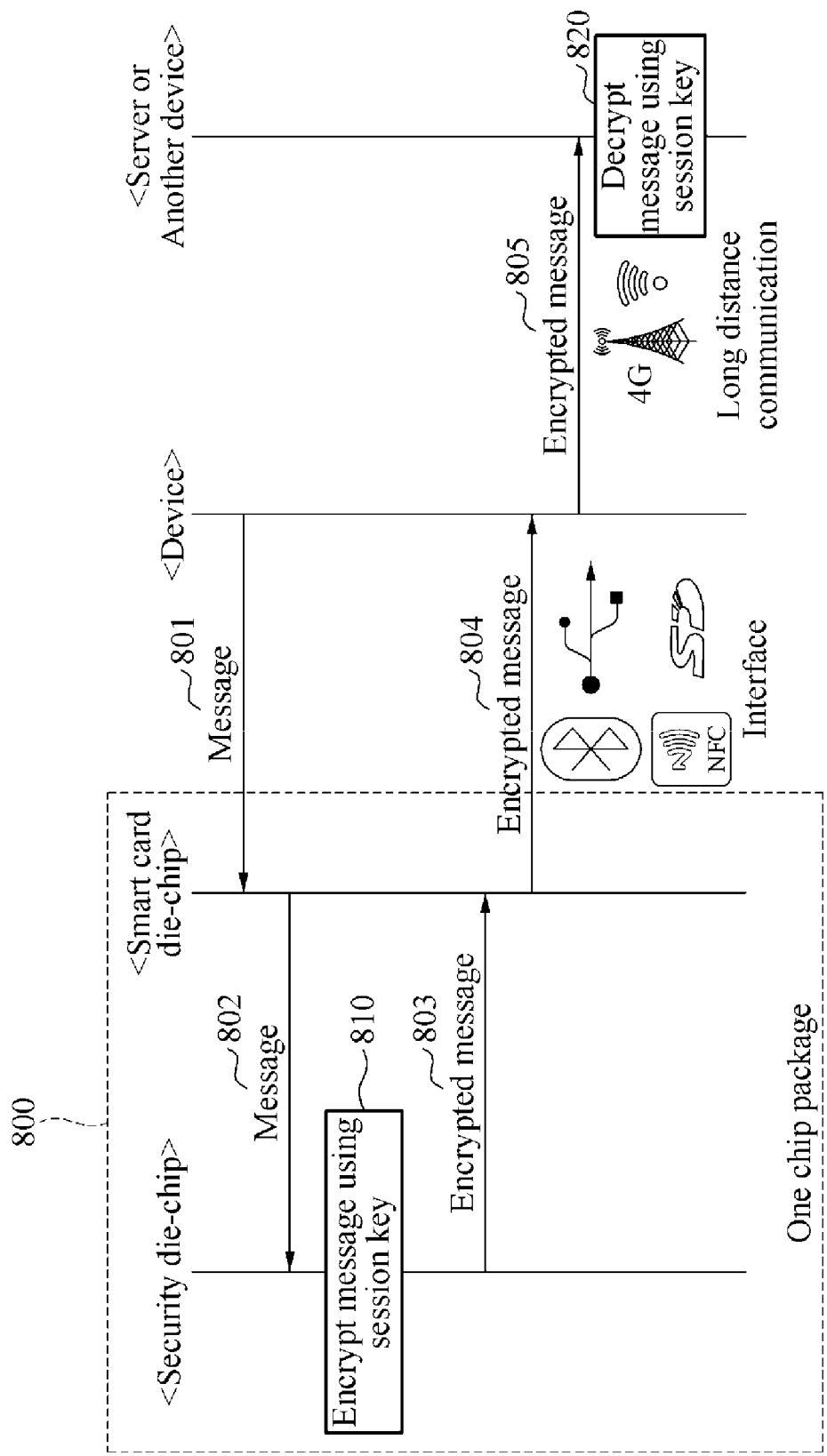

FIGS. 7 and 8 are flowcharts illustrating a security communication method according to an embodiment. Each of authentication apparatuses 700 and 800 may include a security die-chip and a smart card die-chip, and the smart card die-chip may support the security die-chip to perform a security communication. FIG. 7 illustrates a process of receiving a session key for the security communication, and FIG. 8 illustrates a process of security transmission of data using a session key. Referring to FIG. 7, a device may receive an encrypted session key 701 via a broadband communication from a server or another device that is to perform the security communication with the authentication apparatus 700. In operation 710, the server or another device may encrypt a session key to be used for communication, using a public key corresponding to a private key stored in the authentication apparatus 700. The device may transfer an encrypted session key 702 to the authentication apparatus 700. To transfer the encrypted session key 702, an interface of the smart card die-chip in the authentication apparatus 700 may be used. The interface may include, for example, a Bluetooth interface, an SD card slot, an NFC interface or a USB. When the smart card die-chip transfers an encrypted session key 703 to the security die-chip, the encrypted session key 703 may be decrypted using a private key provided by a PUF in operation 720. Thus, the authentication apparatus 700 may acquire a session key used for the security communication.

Referring to FIG. 8, a message 801 that a device desires to transmit using the security communication may be transferred to a smart card die-chip in the authentication apparatus 800 using interfaces, and a message 802 may be transferred to a security die-chip in the authentication apparatus 800. In operation 810, the security die-chip may encrypt the message 802 using a session key acquired as described above. An encrypted message 803 may be transferred to the smart card die-chip, and an encrypted message 804 may be transferred to the device through the interfaces. The device may transfer an encrypted message 805 via a broadband communication to a server or another device. In operation 820, the server or another device may decrypt a message using the session key. As described above, an interface used to connect the smart card die-chip to the device may include, but is not limited to, for example, an SD, a SIM, a Bluetooth interface, a USB or an NFC interface. The security communication of FIGS. 7 and 8 may provide an important advantage, for example, protection of an open communication section. As described above, in an IoT environment and a Machine to Machine (M2M) environment, there is a threat of listening of a subject denying messages exchanged between devices, however, the threat may be prevented based on the security communication. Also, because there is a concern about seizing or loss of an IoT device, for example, a compact sensor, a physical attack, for example, a sub-channel attack may occur. The security die-chip including a PUF and a hardware security module may be robust against the above threat. Thus, the above hardware security may be important in activation of the IoT.

Figure 9:
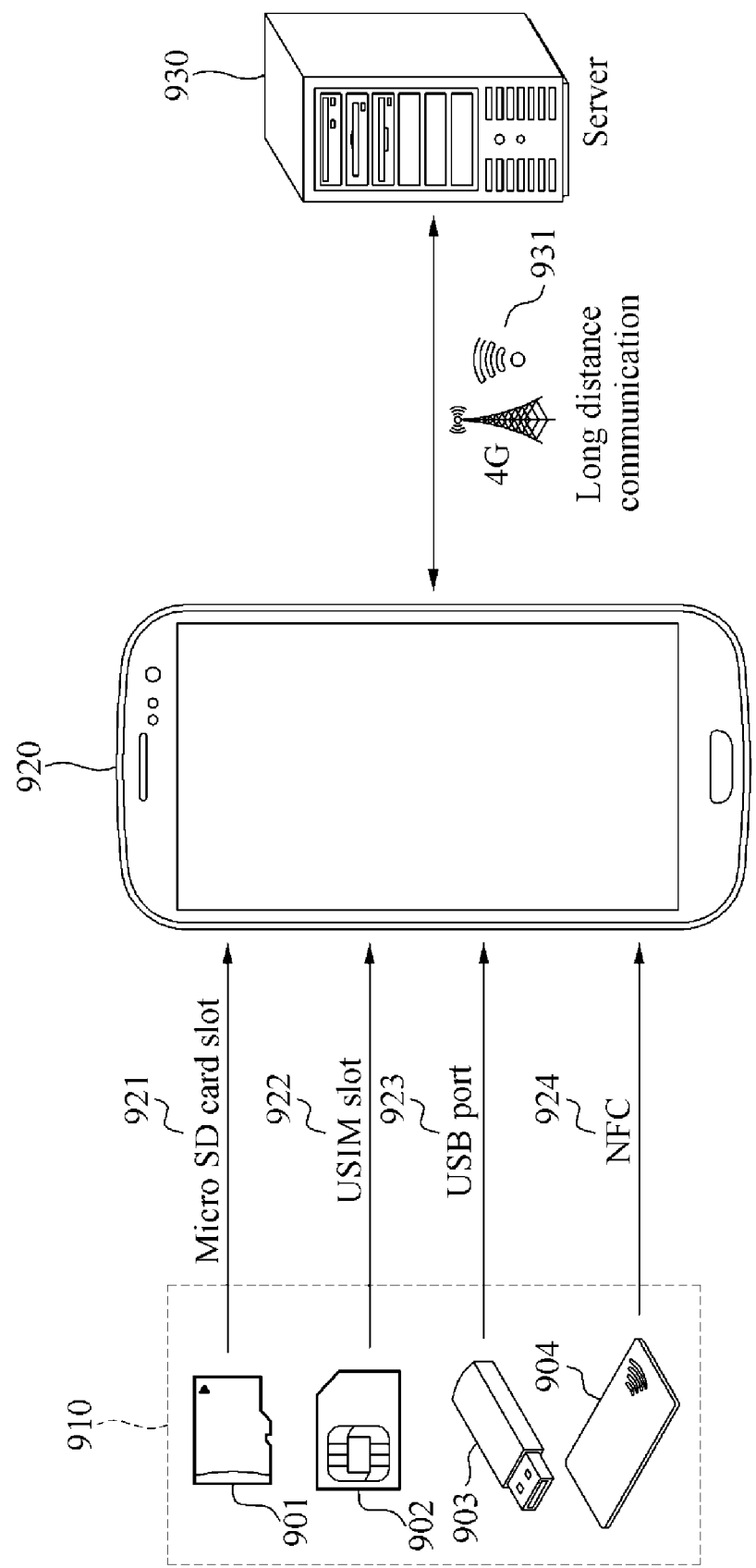
FIGS. 9, 10 and 11 illustrate services according to an embodiment.
Figure 10:
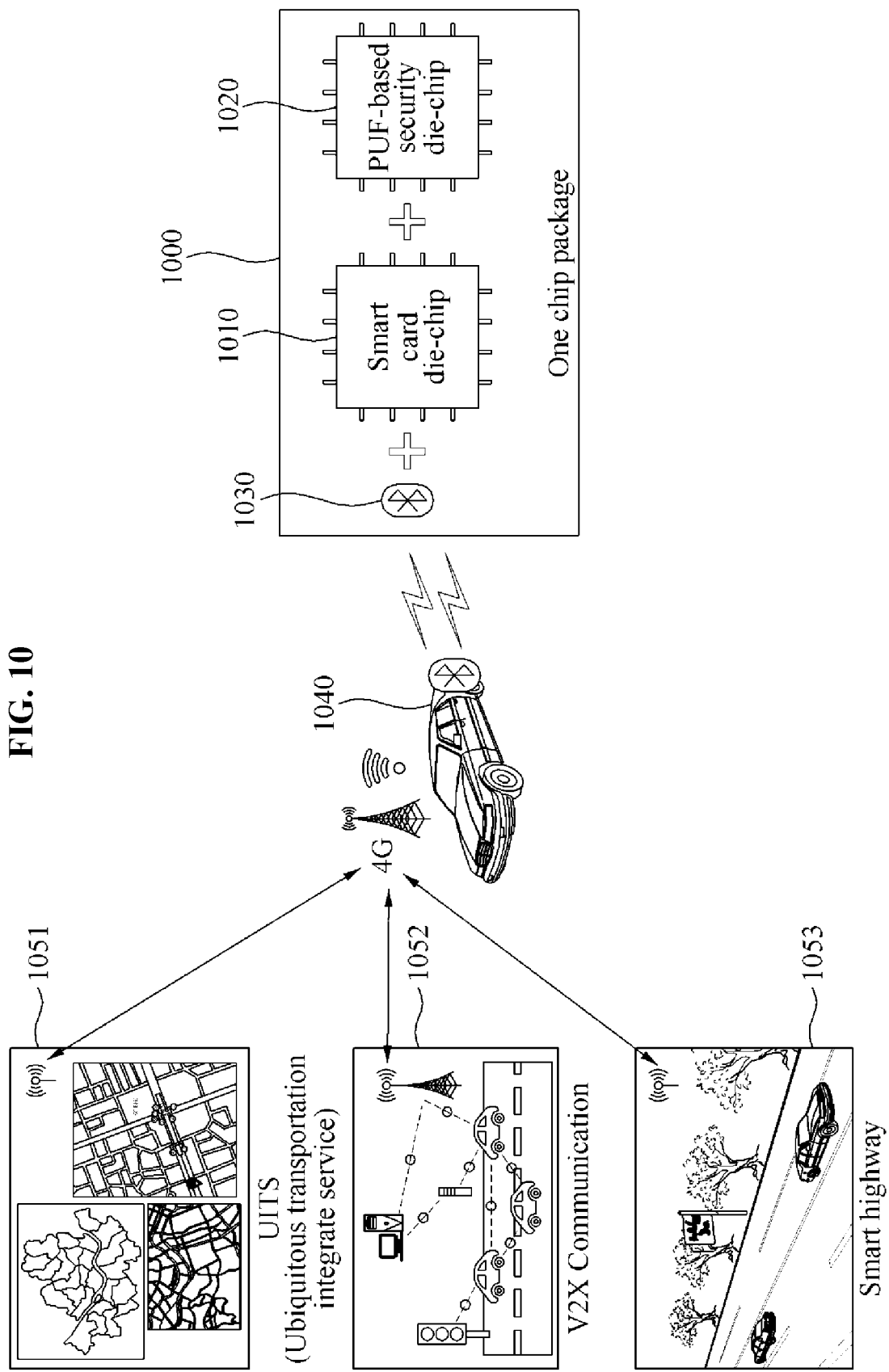
Figure 11:
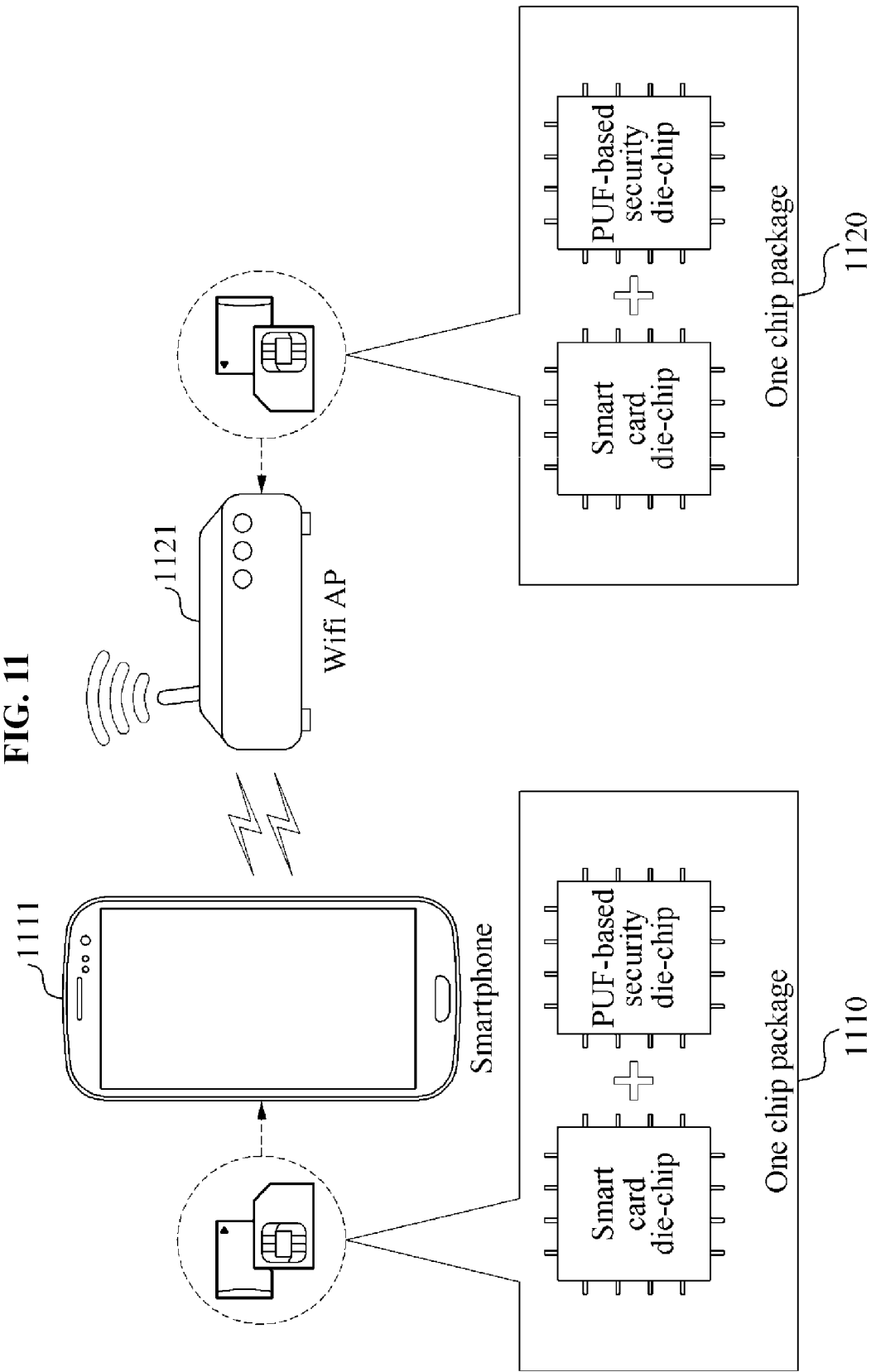

FIGS. 9, 10 and 11 illustrate services according to an embodiment. In FIG. 9, existing interface elements 910 may be connected to a device 920 using an interface of each of the interface elements 910, as described above. The interface may include, for example, a micro SD card slot 921, a USIM slot 922, a USB port 923, and an NFC interface 924. Based on implementation described with reference to FIGS. 1 and 2, a PUF-based security die-chip may be embedded in each of the interface elements 910. A support chip, for example, a smart card die-chip may interoperate with the interface elements 910 and accordingly, the interface elements 910 and the device 920 that do not include a hardware-based security authentication device may include the hardware-based security authentication device. In other words, a micro SD card 901, a USIM chip 902, a USB storage medium 903, and a card 904 having an NFC function in the existing interface elements 910 may be used as hardware-based SEs that are portable and/or that are detachably mounted in a device. In the above application, a user may allow a corresponding SE to interface with the device 920 selectively when necessary while carrying the corresponding SE, instead of needing to embed the corresponding SE in the device 920 and thus, the SE may protect data, perform authentication of the device 920 and perform a security communication with a server 930. The above service may be applicable to vehicles or other access fields.

FIG. 10 illustrates packaging of a smart card die-chip 1010 and a PUF-based security die-chip 1020 as a single chip in a vehicle smart key 1000. The vehicle smart key 1000 may be connected to a vehicle 1040 via an interface of the smart card die-chip 1010 and/or an interface 1030 of the vehicle smart key 1000. The interface 1030 may include, for example, a Bluetooth interface or an ultra-high frequency (UHF) radio frequency identification (RFID) interface. Accordingly, it is possible to perform authentication of the vehicle smart key 1000 and/or the vehicle 1040 connected to the vehicle smart key 1000 and thus, services may be selectively provided. For example, device authentication may be enabled to provide a charged service 1051 for vehicle management, for example, remote door opening or starting control provided by vehicle companies. Also, an application 1052 to perform authentication of a device in autonomous driving and/or smart driving using a vehicle-to-everything (V2X) communication, for example, a vehicle-to-vehicle (V2V) communication and a vehicle-to-infrastructure (V2I) communication, may be possible. Furthermore, the vehicle 1040 may be connected to a smart highway service 1053, and may enable device authentication for smart tolling or providing custom made information.

FIG. 11 illustrates an application to perform authentication of a WiFi access point (AP). Recently, an example in which one of security attacks as threats to a mobile terminal, for example, a smartphone is disguised as a normal WiFi AP and applies to a terminal when the security attack is connected to the terminal, has occurred. In this example, when a hardware-based SE 1120 is mounted in a WiFi AP 1121 to perform device authentication, an illegal security attack may be prevented. Also, a hardware-based SE 1110 may be connected to a terminal 1111 and accordingly, the above-described services, for example device authentication, a security communication and data protection, may be available. A device-to-device (D2D) connection by a paradigm of applications for office administration, militaries and industries as well as applications for private use and home use may be an inexpensive and highly reliable solution to solve a security threat recognized as an issue in an M2M or IoT.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A system comprising:
   an external device without a hardware-based security authentication function, and the external device is a mobile device comprising a port or wireless receiver to receive the authentication apparatus; and
   the authentication apparatus separable from the external device, the authentication apparatus comprising:
   an interface element;
   a security chip comprising a circuit including a Physical unclonable function (PUF) and a hardware-wired security module;
   wherein the hardware-wired security module performs encryption and decryption using the key provided by the PUF,
   wherein the authentication apparatus provides hardware-based authentication to the external device using the encryption and decryption of the hardware-wired security and the key provided by the PUF;
   wherein the PUF is only a portion of the circuit of the security chip, and the security chip further comprising a control circuits to control the security chip to interface with the external device;
   wherein the control circuits comprises a smart card chip.

2. The system of claim 1, wherein the interface element is a secure digital (SD), and
   the external device is a mobile device comprising a port or wireless receiver to receive the authentication apparatus.

3. The system of claim 2, wherein the authentication apparatus receives data from the external device and the security chip encrypts the received data for storage in the SD.

4. The system of claim 1, wherein the interface element is a subscriber identity module (SIM), and
the external device is a mobile phone comprising a port or wireless receiver to receive the authentication apparatus.

5. The system of claim 4, wherein the security chip performs authentication of the external device by communicating with a server via a network through the external device.

6. The system of claim 1, further comprising one or more additional PUFS generating one or more additional keys, wherein only one generated key is used to perform the encryption and decryption.

7. The system of claim 1, wherein the PUF is formed of inter-layer contacts or vias as part of the security chip such that the PUF is not a distinguishable circuit element.

8. A system comprising:
an external device without a hardware-based security authentication function, and the external device is a mobile device comprising a port or wireless receiver to receive the authentication apparatus;
an authentication apparatus package comprising:
an interface element to interface with the external device;
a security chip comprising a physically unclonable function (PUF) and an application specific encryption and decryption logic circuit within a same security chip circuit, the security chip circuit providing authentication to the external device;
wherein the PUF generates a key;
wherein the application specific encryption and decryption logic circuit encrypting and decrypting data using the key;
wherein the authentication apparatus is attachable to the external device to provide hardware-based authentication; and
wherein the authentication apparatus receives messages from the external device, encrypts the received messages, sends the encrypted messages to the external device, and the external device sends the encrypted messages to a server or another device;
wherein the PUF is only a portion of the circuit of the security chip, and the security die-chip further comprising control circuits to control the security chip to interface with the external device;
wherein the control circuits comprises a smart card chip.

9. The system of claim 8, further comprising one or more additional PUFS generating one or more additional keys, wherein only one key is used by the encryption and decryption logic circuit.

10. The system of claim 8, wherein the encryption and decryption is performed without software.

11. The system of claim 8, wherein the external device is a mobile phone with a port to receive the authentication apparatus, and
the encrypted messages are sent by the mobile phone using a broadband network.

12. The system of claim 8, further comprising a second external device and second authentication apparatus performing hardware-based authentication of the first external device.

13. The system of claim 8, wherein the interface element communicates with the external device via wireless communication.

* * * * *